Dec. 28, 1937. H. J. KNERR 2,103,262
FLOWMETER
Filed Jan. 15, 1935
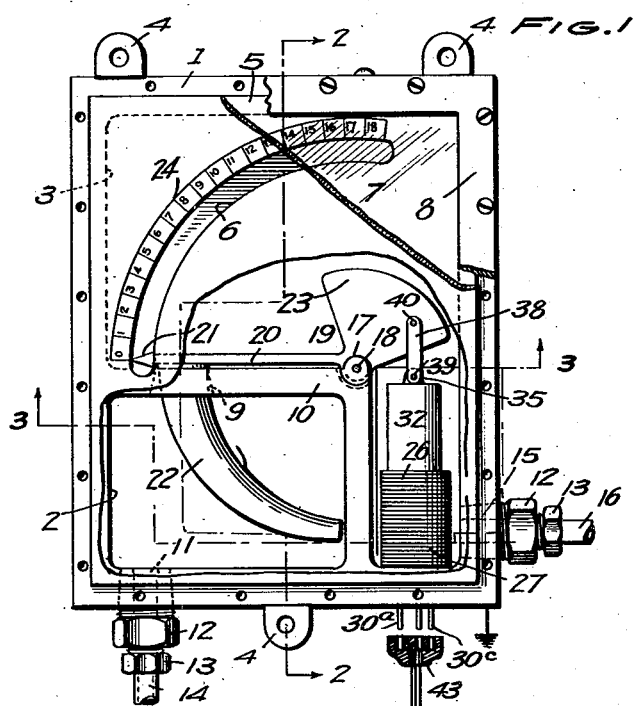
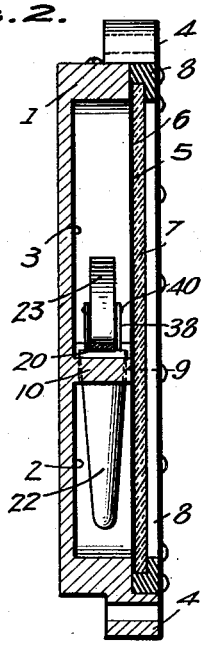
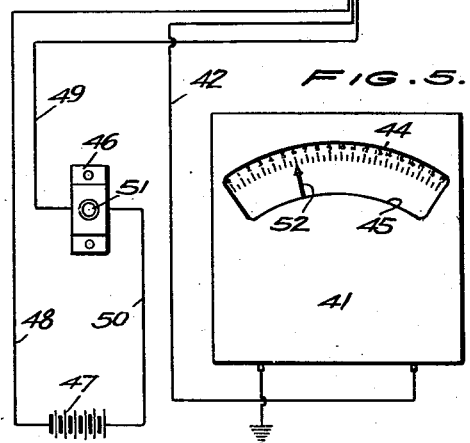
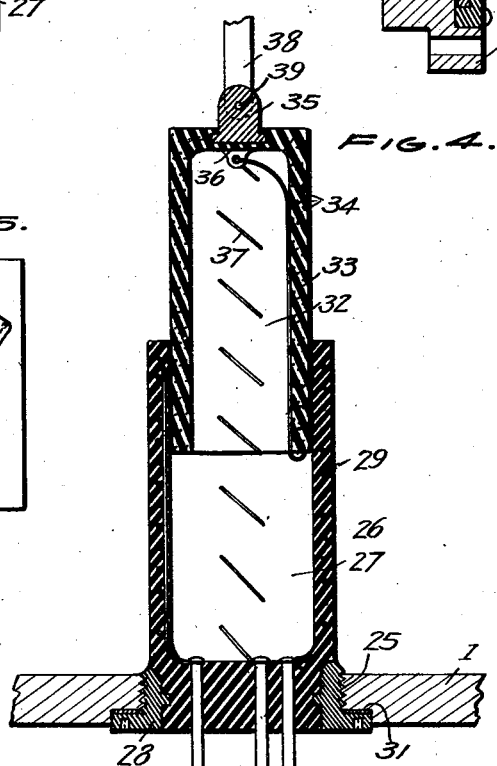
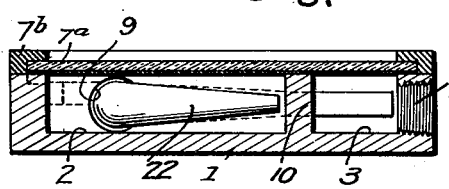
INVENTOR
HUGH J. KNERR
ATTORNEYS Patented Dec. 28, 1937

2,103,262

UNITED STATES PATENT OFFICE 2,103,262

FLOWMETER

Hugh J. Knerr, Osborn, Ohio

Application January 15, 1935, Serial No. 1,905

2 Claims. (Cl. 73—210)

(Granted under the act of March 3, 1883, as amended April 30, 1928; 370 O. G. 757)

The invention described herein may be manufactured and used by or for the Government for governmental purposes, without the payment to me of any royalty thereon.

My invention is intended for measuring and indicating the fuel consumption of internal combustion engines installed in vehicles operating upon land, upon water or within the air.

It is an object of the invention to provide the operator of such a vehicle with a combined measuring and indicating instrument of simple and rugged construction, the indicating scale of which may be readily interpreted.

With the foregoing and other objects in view, which will appear as the description proceeds, the invention consists of certain new and novel improvements in flowmeters, which will be hereinafter more fully illustrated and described in the accompanying drawing and more particularly pointed out in the appended claims.

Referring to the drawing, in which numerals of like character designate similar parts throughout the several views;

Fig. 1 is a frontal view of the measuring and indicating instrument in partial cross-section.

Fig. 2 is a cross-sectional view taken on the line 2—2 of Fig. 1.

Fig. 3 is a cross-sectional view taken on the line 3—3 of Fig. 1.

Fig. 4 is an enlarged cross-sectional view of the dash pot element of Fig. 1.

Fig. 5 is a frontal view of the remotely indicating instrument and electrical system connected therewith.

In Fig. 1, a cup shaped housing 1 is provided with compartments 2 and 3 and the mounting lugs 4. The upper surface of the housing 1 is machined to receive an opaque cover plate 5, provided with an opening 6, a cover glass 7 and a glass frame 8. When the aforementioned parts are screwed fast to the housing 1, the compartments 2 and 3 are without communication except through an orifice 9 provided in the wall 10 therebetween. The lower portion of the housing 1 is provided with a tapped hole 11 adapted to receive pipe fittings 12 and 13 together with a piping 14 secured thereto. The pipe 14 provides a passageway for incoming fuel into the compartment 2. The right hand extremity of the housing 1 is also provided with a tapped hole 15, pipe fittings 12 and 13 together with a pipe 16. The latter fittings and pipe provide an outlet from compartment 3. The wall 10 is provided with lugs 17 to which are pivotally secured by means of pin 18 a metering element 19. The metering element 19 is composed of an arm 20, terminating in a pointer 21, to the outer extremity of which is fixed a metering pin 22. The inner extremity of the arm 20 terminates in an overhanging counter-weight 23. The counter-weight 23 is designed to provide a preponderance of weight upon the metering pin side of the arm 20.

In Fig. 1, the metering element 19 is so positioned that the metering pin 22 substantially closes the orifice 9. Assume that fuel from the pipe 14, having filled the compartment 2, next seeks to escape through the orifice 9 into the compartment 3. If the rate of flow is relatively low, the minimum passage area formed by the gap between the orifice 9 and the base of the metering pin 22 will suffice to permit such passage. If, on the other hand, the rate of flow is appreciably increased, pressure will be built up within the compartment 2 seeking to pivot the metering pin 22 about the pin 18. Assuming a constant head of liquid in the pipe 14, the metering pin 22 will rise to and find equilibrium in that position which furnishes sufficient escapage area to permit uninterrupted flow through the pipe 16. The pointer 21 being fixed relative to the base of the metering pin 22, will always assume the same position of arc above that shown in Fig. 1 under conditions of relatively constant temperature, density, and liquid head. Through actual tests, the exact quantity of fluid escaping by means of the pipe 16 may be determined, after which suitable indication may be inscribed upon the plate 5 opposite the tip of the pointer 21. Through a series of such tests, a scale 24 may be derived to indicate from zero to any desired number of gallons, or other suitable measure, fluid flow per hour, or other suitable increment of time.

Fig. 2 shows the depth on the line 2—2 of Fig. 1, of the housing 1, compartments 2 and 3, cover glass 7, glass frame 8, wall 10, metering pin 22 and counter-weight 23. The opening 6 provided in the opaque cover plate 5 is also clearly shown.

Fig. 3 is a cross-sectional view taken on the line 3—3 of Fig. 1 and shows the bottommost portions of compartments 2 and 3, tapped hole 15 leading from the latter compartment, metering pin 22 and orifice 9.

In Fig. 4, a counterbored and threaded hole 25 is provided in the bottom of the housing 1 for installation of a dash pot 26. Cross reference to Fig. 1 indicates that the dash pot 26, in addition to its well known dampening characteristics, is also intended to provide remote control readings identical to those obtained through reference to the pointer 21 and scale 24. A container 27, forming the lower portion of the dash pot 26, is cast integral with a threaded metallic base 28 adapted to be screwed fast to the hole 25. There are also cast into the body portion of the container 27 primary wiring 29 and socket poles 30a through 30c. A gasket 31 seals the hole 25 against fuel leakage. One terminal extremity of the primary wiring 29 is electrically connected to the socket pole 30a, while the other extremity thereof is similarly connected with the socket pole 30c. A piston 32, of the dash pot 26, consists of a cylinder 33 integrally cast about the secondary wiring 34 and metallic lug 35. One extremity of the secondary wiring 34 is electrically connected to one of the lugs 35, while the other extremity thereof extends upward to and through a boss eyelet 36 provided in the top of the cylinder 33, where it is electrically connected to a wire 37 of small diameter and negligible loading characteristics. The lower extremity of the wire 37 is electrically connected to the socket pole 30b. The piston 32 is joined to the counterweight 23 by means of two links 38 and pins 39 and 40. A side view of the aforementioned parts will be seen by reference to Fig. 2. It is obvious that rotation of the counter-weight 23 about the pin 18 will cause rise or fall of the piston 32 within the container 27. It will also be noted that the metallic lug 35, connected with secondary wiring 34, is grounded to the housing 1 through the pin 39, links 38, pin 40, counter-weight 23, pin 18 and lugs 17.

In Fig. 5, one pole of a micro-voltmeter or micro-ammeter is electrically connected to the socket pole 30b through a wire 42 and socket 43. The other pole of the meter 41 is connected with the ground. Since the housing 1 is also grounded, the presence of induced current within the secondary wiring 34 will immediately be indicated upon the scale 44 seen through the window 45 provided in the meter 41. Socket poles 30a and 30c are connected in series with a buzzer 46 and battery 47 by means of the socket 43 and wires 48 through 50. Thus, at any time that a buzzer button 51 is pushed, pulsating current will flow through the primary wiring 29, causing induced current in the secondary wiring 34, and a reading upon the scale 44 will be obtained with reference to the pointer 52 corresponding to descending of the piston 32 within the dash pot 26. It will be noted that the scales 24 and 44 are provided with identical units of flow measure. By means of the arrangement of parts set forth in Fig. 5, identical and remote readings of the scale 24 may be had at a point distant from the location of the housing 1.

I claim:

1. In a flowmeter, a housing having a receiving cavity and a discharge cavity, a dividing wall between said cavities having an orifice of predetermined flow characteristics, metering means comprising an arm terminating in a pointer having its base pivotally secured to said dividing wall and including an arcuate tapered pin depending from the free end thereof and a weight overhanging the pivoted end thereof to partially counterbalance said tapered pin and arm about their pivoted support, said metering means being controlled by the flow of fluid from said receiving cavity through said orifice, and a cover plate for sealing said cavities and metering means including an arcuate scale for measuring movement of said pointer for indicating rate of fluid flow through said orifice.

2. In a flowmeter, a housing having a receiving cavity and a discharge cavity, a dividing wall between said cavities having an orifice of predetermined flow characteristics, metering means comprising an arm having its base pivotally secured to said dividing wall and including an arcuate tapered pin depending from the free end thereof and a weight overhanging the pivoted end thereof to partially counterbalance said tapered pin and arm about their pivoted support, said metering means being controlled by the flow of fluid from said receiving cavity through said orifice, a cover plate for sealing said cavities and metering means, and means responsive to movement of said metering pin for indicating rate of fluid flow through said orifice.

HUGH J. KNERR.